Figure 1:
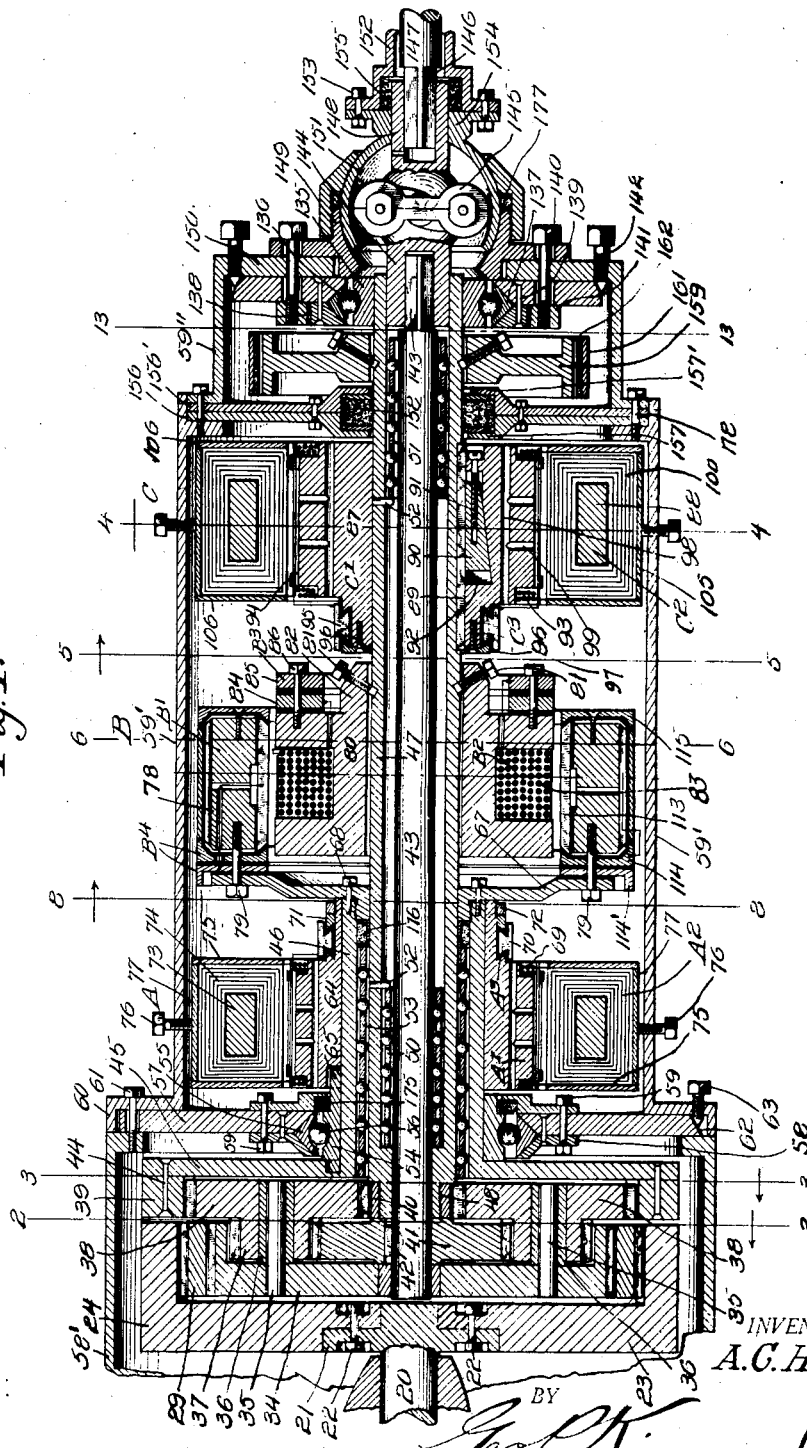

Oct. 27, 1925.  
A. C. HESS, JR  
1,558,806  
ELECTROMECHANICAL POWER TRANSMISSION MECHANISM  
Filed Dec. 7, 1921  5 Sheets-Sheet 2

INVENTOR.  
A. C. Hess. Jr.  
BY  
Geo. F. Kimmel, ATTORNEY.

Oct. 27, 1925.
A. C. HESS, JR
1,558,806
ELECTROMECHANICAL POWER TRANSMISSION MECHANISM
Filed Dec. 7, 1921     5 Sheets-Sheet 3
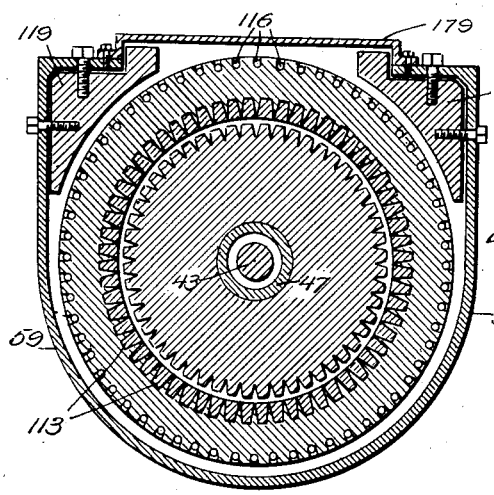
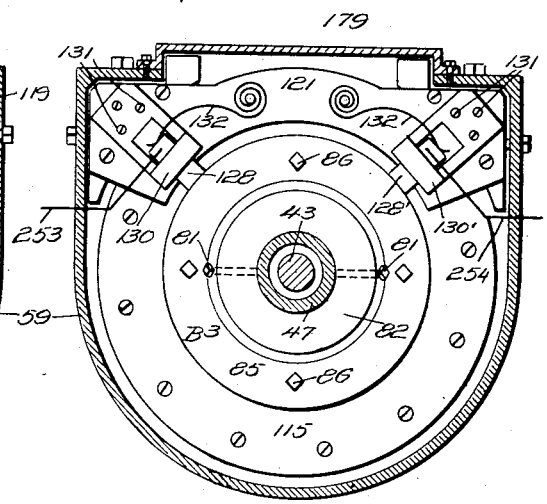
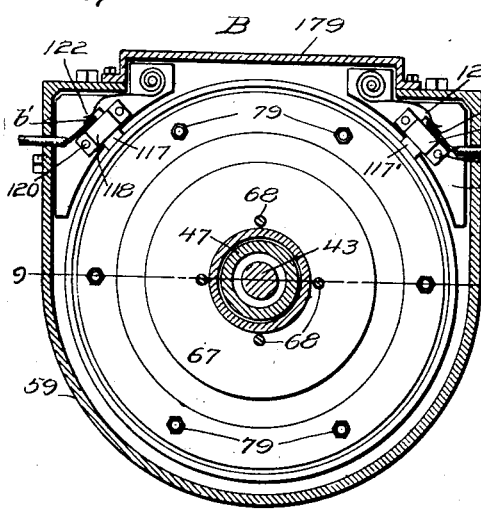
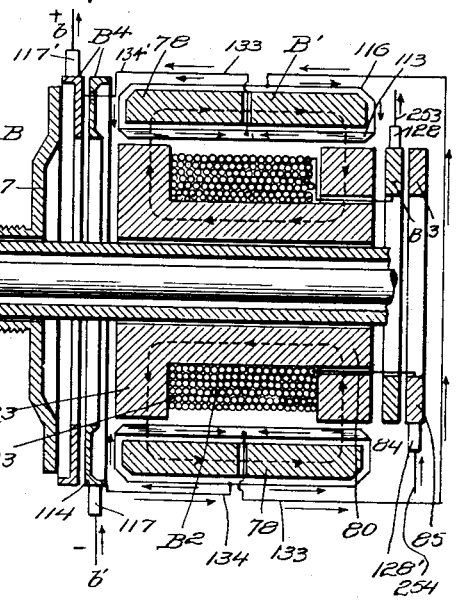
INVENTOR.
A. C. Hess, Jr.
BY
Geo. F. Kimmel   ATTORNEY.

Oct. 27, 1925.

A. C. HESS, JR 1,558,806

ELECTROMECHANICAL POWER TRANSMISSION MECHANISM

Filed Dec. 7, 1921     5 Sheets-Sheet 4

Fig.10.

INVENTOR
A.C.Hess, Jr.
BY Geo. P. Kimmel
ATTORNEY.

Oct. 27, 1925.
1,558,806
A. C. HESS, JR.
ELECTROMECHANICAL POWER TRANSMISSION MECHANISM
Filed Dec. 7, 1921
5 Sheets-Sheet 5
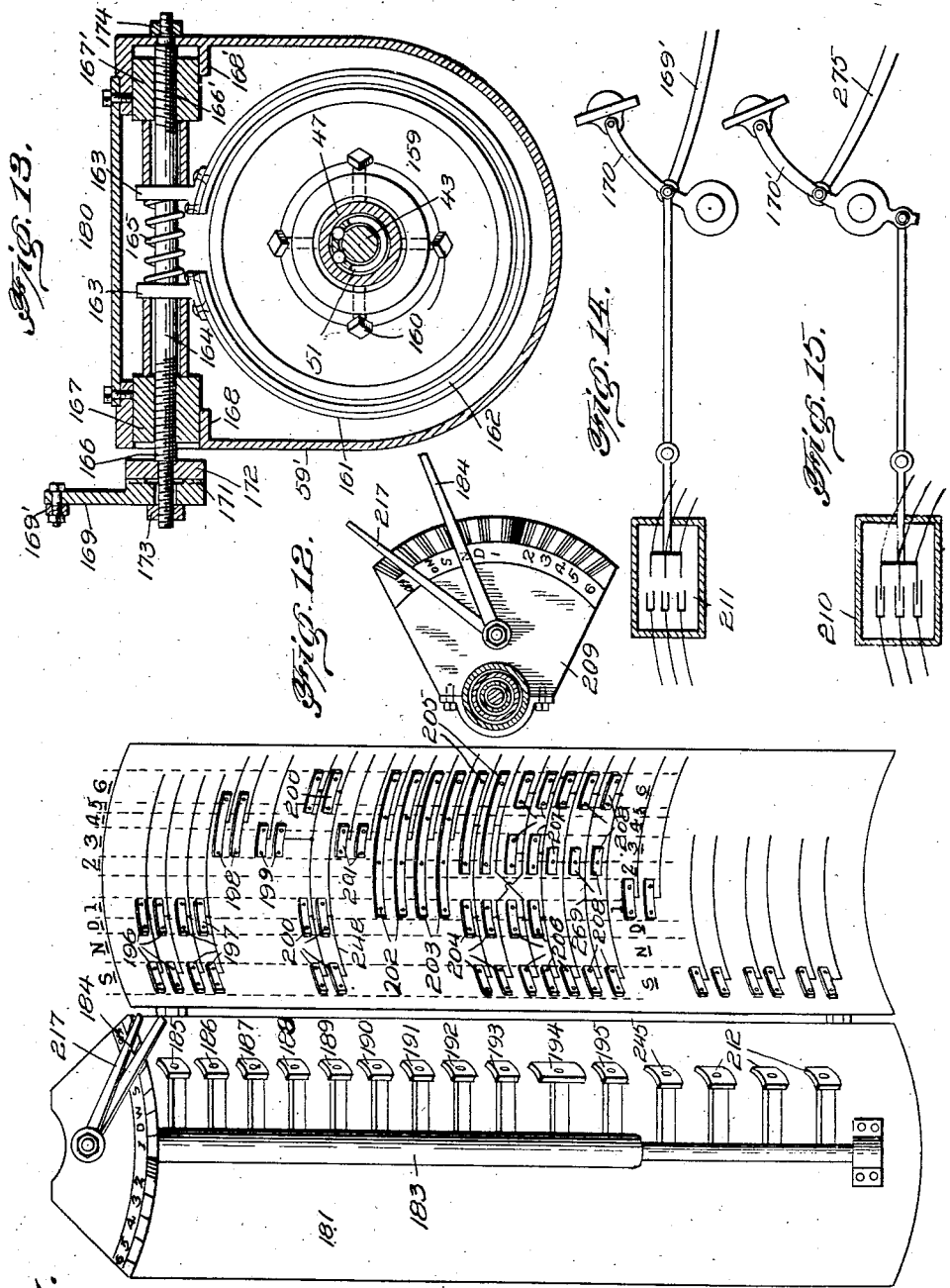
INVENTOR.
A. C. Hess, Jr.
BY
Geo. F. Kimmel ATTORNEY.

Patented Oct. 27, 1925.

1,558,806

UNITED STATES PATENT OFFICE.

ALMA C. HESS, JR., OF UNION, OREGON.

ELECTROMECHANICAL POWER-TRANSMISSION MECHANISM.

Application filed December 7, 1921. Serial No. 520,562.

*To all whom it may concern:*

Be it known that I, ALMA C. HESS, Jr., a citizen of the United States, residing at Union, in the county of Union and State of Oregon, have invented certain new and useful Improvements in Electromechanical Power-Transmission Mechanisms, of which the following is a specification.

This invention appertains to certain improvements in power transmission and control mechanisms for motor driven vehicles of all characters and descriptions, such as automobiles, motor trucks, and the like, and more particularly to an electro-mechanical type of such mechanisms and control devices therefor and is a continuation in part of my application filed April 23, 1921, Serial Number 376,178.

The principal object of the invention is to provide for a transmission mechanism of the class mentioned to effectively and efficiently facilitate the starting up of the power motor or engine of an automobile or the like; similarly transmit the power of the motor or engine to the driven wheels of the automobile at various speeds thereof without any appreciable decrease or slacking off in the torque developed by or the turning movement of the driving wheels of the automobile or the moving parts of the mechanism; and similarly generate the electric current necessary for the ignition, lighting and battery charging circuits of the automobile, and to otherwise render comparatively easy and safe the control and operation of automobiles generally.

Another object of the invention is to provide for a transmission mechanism of the type set forth, and one of a construction, arrangement and operation providing for a greater flexibility of control of the speed of an automobile or the like with a corresponding silent and smooth operation of the mechanism and consequently to the automobile as a whole, such as will not only add to the ordinary pleasure and comfort in the driving of and riding in automobiles, but also render safe the control of an automobile to which the mechanism is applied.

A further object of the invention is to provide for a power transmission of the character mentioned, and one involving the use of an improved type of planetary gearing for effecting the initial transfer of power from the engine or motor of an automobile, whereby a maximum amount of the power developed by the engine or motor at any given speed thereof is delivered to the driving wheels of the automobile, the transfer of power from the planetary gearing to the driving wheels being finally accomplished through the medium of certain electric devices interposed between the said planetary gearing and the driving wheels for such purpose.

With the foregoing and other important objects in view, the invention resides in the certain novel and useful construction, arrangement and operation of devices, circuits and parts as will be hereinafter more fully described, set forth in the appended claims, and illustrated in the accompanying drawings, in which:—

Figure 2:
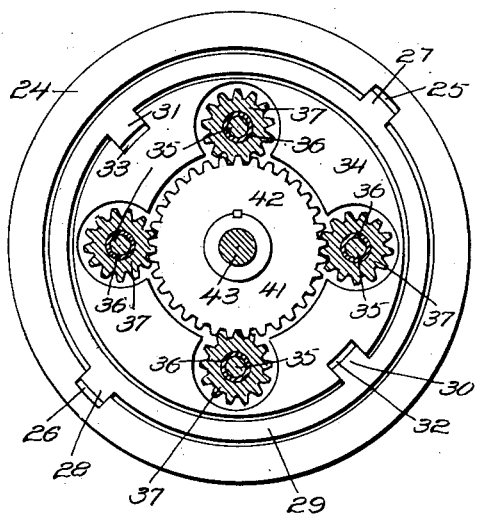
Figure 3:
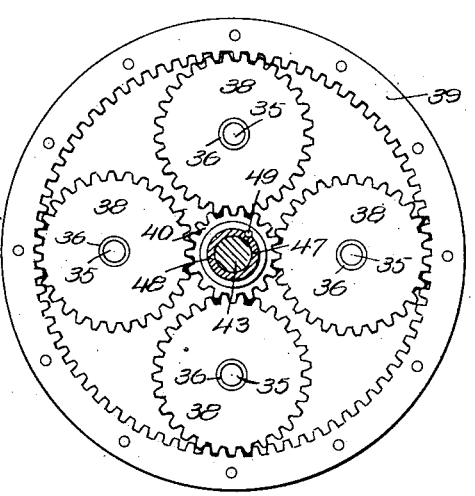
Figure 4:
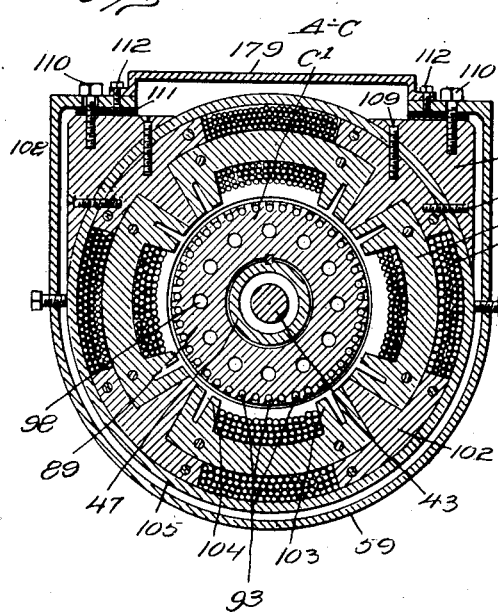

Figure 1 is a horizontal section through a preferred assembly or embodiment of the mechanism in its entirety, and showing a preferred manner of connecting the same with the engine or motor of an automobile or the like, Figure 2 is a vertical section taken on the line 2—2 of Figure 1, and shows one side of the planetary gear train portion of the mechanism, Figure 3 is a similar section taken on the line 3—3 of Figure 1, and shows the opposite side portion of the planetary gear train thereof, Figure 4 is a vertical section taken on the line 4—4 of Figure 1, and showing a preferred construction of an electric-motor-generator used as the first of the electric units of the mechanism.

Figure 5:
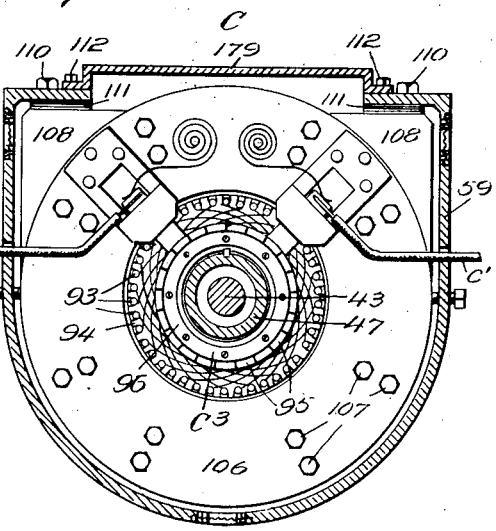

Figure 5 is a similar section taken on the line 5—5 of Figure 1 through the casing enclosing the mechanism, and shows the bored end of the third of the electrical devices or units in elevation therein, Figure 6 is a vertical section taken on the line 6—6 of Figure 1, and shows a preferred construction of the second or intermediate electrical device or unit, Figure 7 is a similar section taken on the line 5—5 of Figure 1, but looking in the opposite direction from that of Figure 5, and shows one end of the second or intermediate electric device or unit in elevation.

Figure 8 is another similar section taken on the line 8—8 of Figure 1, and shows an end elevation of the second or intermediate electrical device or unit opposite to that as disclosed in Figure 7, Figure 9 is a diagrammatical horizontal section taken on the line 9—9 of Figure 8, Figure 10 is a diagrammatical plan view of the control circuits of the electrical portion of the transmission mechanism, Figure 11 is a diagrammatic view of a controller illustrating the bridging arrangement for the contacts, Figure 12 is a top plan view, partly in section, of the manual control means or controller for effecting the desired operation of the transmission mechanisms, Figure 13 is a vertical section taken on the line 13—13 of Figure 1, and shows the emergency transmission brake and a portion of the operating mechanism therefor, Figure 14 is a diagrammatical view, partly in section, of the emergency brake actuating foot pedal and its connections with the brake mechanism and the parallel switching device for controlling the electrical portion of the power transmission mechanism, Figure 15 is a similar view of the electric clutch control switch and its connection with the service brake pedal of the automobile.

Referring to the drawings wherein similar characters of reference designate corresponding parts throughout the several views thereof, the numeral 20 indicates the crank shaft of an engine or motor (not shown), of an automobile or the like, having a flange 21 formed at its rear end to which is secured, by means of bolts 22, a fly wheel 23. This fly wheel 23 is provided with a flange 24 which over-hangs and partially encases a planetary gear mechanism, and has a pair of slots or splines 25 and 26 formed in the inner periphery of the flange 24 in which are engaged lugs 27 and 28 complementally formed on the outer periphery of a coupling ring 29 whereby the latter is carried by the fly-wheel 23. The inner periphery of the coupling ring 29 is formed with a pair of diametrically disposed lugs 30 and 31 which are engaged in complementally disposed slots or splines 32 and 33 formed in the outer periphery of a planetary pinion plate 34, whereby power is transmitted to the latter through the coupling ring 29 and the fly wheel 23 from the crank shaft 20. The pinion plate 34 is provided with a plurality of stub shafts 35, preferably four in number. The shafts 35 are spaced equi-distant from each other and project from the rear face of the plate 34, and the latter, in connection with the shafts 35, provides what may be termed a gear carrier, as the said shafts 35 carry bushings 36 on which are journaled compound planetary pinions. Each of said compound pinions comprises a small pinion element 37 and a large pinion element 38. The compound planetary pinions take a bodily motion similar to that of the gear carrier, but of themselves are free to rotate in either direction on the shafts 35. The direction of the rotation of the said planetary pinions 37, 38, is governed by a high speed internal gear 39 and a slow speed sun spur gear 40, the gear 39 having its teeth arranged in mesh with the teeth of the larger pinions 38 and outwardly of the several peripheries thereof, and the spur gear 40 its teeth also in mesh therewith and between the inner adjacent peripheral portions of the same. The planetary pinions 37, in turn, have their teeth arranged in mesh with the teeth of a driven gear 41, which is secured, by means of a key 42, to a driven transmission shaft 43, the latter being constructed of a suitable non-magnetic metal. This transmission shaft is arranged, together with the gear 41, to drive the traction wheels (not shown) of the automobile. The high speed internal gear 39 is fastened, by means of rivets 44 to a circular plate or disk 45 which is formed to provide a rearwardly extending integral hub portion 46. The slow speed sun spur gear 40 is carried at the forward end of a tubular housing 47, which end is of a reduced diameter and left hand threaded as at 48, for rearwardly securing the gear in position thereon, a dowel pin or the like 49 being provided for preventing the accidental displacement of the gear 40 from its operative position thereon. (See Figures 1 and 3). This tubular housing 47 is substantially co-extensive with the rearwardly extending portion of the transmission shaft 43, and encloses the same, it being journaled for relative turning movement thereon by means of cylindrical cages of ball bearings 50 and 51 at the opposite end portions. The bearing cages are held in position against displacement by means of pins 52 extending through the wall of the tubular housing 47 for the purpose. In its turn, the hub 46 of the internal gear plate 45 is journaled on the forward end of the tubular housing 47 and for rotary movement relative thereto by means of a cylindrical cage of ball bearings 53 surrounding the housing immediately in rear of the sun gear 40. A main bearing is provided for the journaling of the forward end of the tranmission shaft 43 and the tubular housing 47, together with the hub portion 46 of the internal gear plate 45 in position, and the same consists of an annular race way 54 surrounding the hub 46 and an outer annular race way 55 concentrically positioned with respect to the race way 54, between which are interposed a series of ball bearings 56. The outer race way 55 is preferably V-shaped in cross section, and is clamped in position between the oppositely bevelled walls of a closure plate 57 and a separate annular clamp ring 58 secured to the plate 57 by means of bolts 59. The beveled wall of the closure plate 57 forms the wall of a circular opening formed centrally thereof, and through which the shaft 43, the housing 47, and the hubs 46 are inserted. The closure plate 57 is clamped in position between the rear open end of the crank case 58' of the engine and the abutting end of a casing 59' which incloses the transmission mechanism as a whole. The casing 59' is outwardly flanged, as at 60, to facilitate the fastening thereof, by hold-fast devices 61, to the rear flanged edge of the crank case 58'. The peripheral edge of this closure plate 57 is beveled, as at 62, for the cooperation therewith of tapered screws 63, by means of which the plate is adjusted in its position for the proper aligning of the main bearing carried at the central opening therein. The casing 59' is preferably formed of a non-magnetic metal such as aluminum, and the closure plate 57 at the forward end thereof separates the interior of the same from that of the crank case 58', and by this abutting arrangement of the transmission to the motor it provides what may be termed a unit power plant.

Mounted within the transmission casing 59 are a series of three dynamo electric machines, designated generally as at A, B and C, the first of the machines A being in the form of a dynamo, used during certain periods of the operation as a motor and in other periods as a generator and is of a multi-polar type, consisting of the armature $A^1$, the field structures $A^2$, and the commutator $A^3$; the second of the dynamos B, in the form of an acyclic, homopolar or unipolar dynamo, consisting of the armature $B^1$, the field structure $B^2$, and the collector rings $B^3$; and the third of the machines C, is of the same construction as that of the multi-polar dynamo A, consisting of the armature $C^1$, the field structure $C^2$, and the commutator, $C^3$, respectively. The core 64 of the armature $A^1$, of the dynamo A, is mounted on and is rotatable with the hub portion 46 of the plate 45. The core 64 and plate 45 are provided with recesses into which extend clutch connections 65, formed on the sides of the ball race 54. A circular plate 67 is secured, as at 68, to the inner end of the hub 46 and bears against the core 64 for holding it in contact with the clutch connections 65 and plate 45. By this arrangement means is provided to hold the core 64 of the dynamo A, so that it will have the same motion as the plate 45, hub portion 46 and element 39. The clutch connections 65 are a part of the ball race 54, but do not move longitudinally. The armature core 64 is provided with retaining bands 69, commutator segments 70, a clamp ring 71 and a clamp nut 72, for securing the commutator segments 70 in position, and these parts of the same will be hereinafter more fully described. The field structure $A^2$, of the dynamo A, comprises yokes 73 provided with suitable windings 74, and the opposite sides of these yokes 73 are enclosed between cover plates 75. The field structure as a whole is mounted within the casing 59', by adjusting screws 76 which are threaded inwardly of the latter for such purpose. The several yokes 73, of this field structure, are also enclosed within an annular ring or casing 77, with which the screws 76 are cooperative for the purpose of adjustment. The armature $B^1$, of the second dynamo B, comprises a core 78 mounted within the transmission casing 59' rearwardly of the hub plate 67, and secured to the latter for rotation therewith, and consequently with the armature $A^1$ of the dynamo A, by means of lag screws 79. Positioned within the armature $B^1$ is the core 80, of the field structure $B^2$ of the dynamo B, which core is secured to the tubular housing 47 for rotation therewith and by means of set screws 81 threaded inwardly of a non-magnetic collar 82, which is brazed or welded to the core 80 for the purpose. The core 80, of the field structure $B^2$, is constructed in one piece cylindrical form of any suitable metal such as soft cast iron, and is provided with a single centrally disposed annular slot in which is fitted the field winding or magnetizing coil 83, and secured at the rear end of the core 80, are the collector rings $B^3$ formed of two sections 84 and 85, insulated one from the other and from the core, and secured to the latter by means of hold-fast devices 86. The armature $C^1$, of the rear or third dynamo C, comprises a core 87, which is mounted directly on the tubular housing 47, and within the core 88 of the field structure $C^2$ thereof, and has its commutator $C^3$ disposed in abutting relation with respect to its forward end, substantially as shown in Figure 1. This armature $C^1$ is secured to the tubular housing 47, by means of a straight key 89, which is held in engagement with a spline formed in the housing 47, through the medium of a wedge member 90, shifted by means of a draw bolt 91. The armature core 87 is recessed as at 92 inwardly of the wall of its shaft bore for the reception of the wedge block 90, which is inserted into proper position therein prior to the armature 87 being slipped onto the tubular housing 47. The armature core 87, of the armature $C^1$, has a winding 93 composed of several turns of comparatively coarse wire, held in the slots thereof by means of thin narrow inductor retaining bands 94, while the commutator $C^3$ at the forward end thereof is formed of a series of insulated segments 95 held in position by means of a clamp ring 96, which is fastened to the core 87 by means of screws 97. Both of the armatures $A^1$ and $C^1$, of the dynamos A and C, respectively, are formed to provide longitudinally extending ducts 98 and radially extending ducts 99 leading from the ducts 98 at points intermediate the opposite ends thereof. The armatures A¹ and C¹, of the dynamos A and C, are drum simplex single re-entrance wave wound, and the windings thereof consist of forty-two inductors with a front pitch of plus eleven and a back pitch of plus 9 making the armature average and also the commutator pitch 10. This winding has two paths in parallel through the armatures, so that only two brush sets are required with each machine, although any suitable drum or barrel wound armature with a cross connected commutator may be used.

Referring especially to Figures 1, 4 and 5, the field windings 100 are wound upon the yokes of horse shoe shaped solid cast iron magnet cores 101, which construction affords an electro-magnet of many ampere turns in relation to the cross section of the iron. These cores 101 are separated by brass wedges 102, and have the pole horns 103 thereof arranged within the field structure in a manner to have like poles adjacent each other, and each of these horns 103 are slotted, as at 104, to provide for transversely disposed narrow pole tips in each, thus making them magnetically saturated and in a manner to prevent field distortion. The wedges 102 and the outside of the windings 100 are covered and bound by a binding ring 105 of any suitable non-magnetic metal. The opposite sides of the field magnet cores 101 and the wedges 102, of both the dynamos A and C, are coupled together through the medium of brass cover plates 106, which are secured in position by means of bolts 107 passed transversely through the plates and covers 101. The field structures A² and C², of the dynamos A and C, are supported in position within the transmission casing 59 by means of oppositely disposed saddles 108, which have screws 109 threaded into the field structures. The saddles 108 are adjustably connected to the casing 59' by the screws 110 and 112. Liners 111 are interposed between the saddles 108 and casing 59'. The field structures A² and C² are vertically and horizontally adjustable within the casing 59'. The dynamos A and C are preferably designed to operate at comparatively low speed, seldom exceeding twelve hundred revolutions per minute, and, by reason of the extreme simplicity of the construction and arrangement thereof, are provided with non-shiftable or permanent brushes, as hereinbefore mentioned.

Referring especially to Figures 1, 6, 7, 8 and 9, the inductors 113 of the armature B¹ of the acyclic dynamo B, are of a solid piece of copper with a cross sectional shape similar to the frustum of a cone and are held on the inner cylindrical surface in substantially V-shaped slots of the armature core 78, in a manner somewhat similar to that of commutator segments of well known commutator constructions, by a commutator ring 114 acting as a clamp at one end of the armature, while the armature cover plate 115 clamps the other end thereof. The conductors 116 are fastened at each end of the inductors 113 to provide for a plurality of looped inductors surrounding the core 78, and which are connected in circuit as will be hereinafter explained. The commutator rings 114, 114' are insulated one from the other and from the adjacent parts of the mechanism, and secured in position between the hub plate 67 and the armature B¹, by means of lag screws 79, and cooperative therewith are suitable brushes 117, 117' held in brush holders 118, 118', insulated from but fastened to brackets 119, by means of screws 120. The brushes 117, 117' are tensioned in position to bear against the periphery of the rings 114, 114', by means of suitable springs 122. The pole faces 123, of the field structure B² of the dynamo B, are slotted for the purpose of concentrating the magnetic flux set up therein at the narrow pole tips formed by the slotted arrangement of the pole pieces. The field windings 83 are excited or energized by batteries 231, through the medium of leads 253 and 254. Suitable brushes 128, 128' are associated with a second pair of commutators or slip rings 84, 85 secured to the rear face of the rotating field B², and are supported in brush holders 130, 130' secured by bolts 131 to a plate 121 fastened to the ends of the brackets 119. Suitable springs 132, similar to the springs 122 as hereinbefore mentioned, are provided for the tensioning of the brushes 128, 128' against the peripheral surfaces of the rings 84, 85, substantially as shown. It will be seen in the wiring of this homopolar dynamo B, as in Figure 9, that the field flux, the trend of which is shown by the dotted line, induces a parallel current in each inductor loop 113 of the armature B¹, the direction of which is shown by the arrows arranged adjacent the leads 253, considering the direction of rotation of the armature to be clockwise. These inductor loops 113 are preferably sixty in number, and are all connected in series, by means of conductors 133 passing through holes at or near the center of the cylindrical armature core 78 and are connected to the commutator rings 114, 114' by leads 134, 134'. The field and armature cores of all three of these dynamo electrical machines A, B and C, are not laminated for any currents in these machines for their special use in connection with planetary gears is to be desired, and greatly adds to the power of the latter.

Referring again to Figure 1, the rear end of the tubular housing 47 is journaled in a rear main ball bearing consisting of an inner race way 135, the bearing balls 136, and an outer race way 137, all positioned within a housing 138 formed of two sections riveted together, as at 139. One of the sections of the housing 138 projects from the other section and has extending therethrough bolts 140 carrying a retaining ring 141. That part of the housing 138 through which extend the bolts 140 has its outer edge beveled for cooperation with a series of tapered end screws 142, whereby the main bearing may be adjusted in proper aligning relation to receive the rear ends of the tubular housing 47 and the transmission shaft 43 contained within the same. The transmission shaft 43 extends longitudinally through the tubular housing 47 and is squared or splined at its rear end as at 143, and fitted into one of the female couplings 144 of a universal joint 145, while the squared portion 146 of a torque rod or drive shaft 147, disposed in alignment with and in rear of the transmission shaft 43, is fitted into the other female coupling 148 of the joint 145. This universal joint 145 is housed within a socketlike casing consisting of an inner portion 149 secured to the rear end wall 150 of the casing 59′, and an outer semi-spherical portion 151, while the rear driven shaft 147 is encased within a housing 152, which couples at its forward end, as at 153, to a rearwardly extending portion 154 of the portions 151, the adjacent ends of the housing 152 and the portion 154 being flanged to receive the bolts 153, while this end of the housing 152 is also formed to provide an annular space surrounding the engaged end portion of the female coupling member 148 for the reception therein of a packing 155. Secured at the rear end of the casing 59′ is a casing 59″ of a slightly reduced diameter, and clamped between the abutting ends of the same is a partition wall consisting of a pair of plates 156, 156′, formed at their centers to provide oppositely disposed depressed portions 157, 157′ providing a channel-way or gland for the reception of a packing 158. The packing 158 acts as an oil dam between the forward and rear portions of the main casing 59′. Mounted within the interior of the rear portion 59″ of the housing 59′, is a brake drum 159, which is fastened to the shaft housing 47 by means of set screws 160. The drum 159 has cooperative therewith, a brake band 161 provided with a lining 162. As shown in Figure 13, the opposite ends of the band 161 are provided with ears 163 disposed parallel one to the other, and which have aligned openings therein engaged by an operating rod 164. A tensioning spring 165 is interposed between the ears 163 to normally force the same apart and prevent engagement of the brake band 161 with the drum 159. The opposite ends of the rod 164 are right and left hand threaded as at 166, 166′, and engage in complementally threaded nuts 167, which are held against turning movement within the opposite side walls of the housing portion 59″, as at 168, 168′, and this rod 164 is operable by means of a lever arm 169 connecting through the medium of a reach rod 169′ to the emergency brake pedal 170 of the motor vehicle on which the mechanism is installed. The lever arm 169 is adjustable on the rod 164, by means of a series of radial teeth formed therewith, and suitably engaged, as at 171, with a corresponding series of teeth on the opposed face of a collar 172 secured on the rod 164 for the purpose, the lever arm 169 being clamped into adjusted engagement with the collar 172 by means of a nut 173, while the other end of the rod 164 is provided with a securing nut 174 to prevent endwise movement thereto. This brake mechanism has a two-fold purpose in its association with the power transmission mechanism, it first acting as a transmission brake when applied, if the dynamo electric machines are clutching or preventing a motion in the planetary gears by the hereinafter controlling units of the machines, and second, as an emergency slow speed brake should the electric mechanism become inoperative. Suitable packing glands, or oil dams, other than those hereinbefore mentioned, are provided, one at 175 between the forward main ball bearings 56 and the dynamo A; a second at 176 between the race way 50 and the hub plate 67; and a third at 177 between the adjacent portions of the casing enclosing the universal joint 145, and the mechanism, forward of the partition plates 156, 156′, is to be lubricated from the crank case of the engine or motor of the automobile, while the interior of the brake drum casing 59′ will be filled, or partially filled with a similar lubricating oil, which will, in turn, lubricate the universal joint 145. The housing sections 59′, 59″, are removably secured together by means of bolts 178, and are each formed to provide removable top cover portions 179, 180, respectively, whereby the separate mechanisms may be readily inspected and repaired one without interference with the other, and, by reason of the bolted connections between the casing 59′ and the crank casing 58′ and the driven shaft casing 152 with the universal joint casing, the transmission as a whole may be readily placed in position on a motor vehicle, or removed therefrom as a unit without disturbing the other mechanisms thereof.

The storage batteries 231 used with this transmission mechanism are preferably the steel grided iron, nickel low voltage cells of any convenient number and are connected in series parallel of any desirable grouping such as; two in series with two such sets in parallel; three in series with three such sets in parallel; or four in series with four such sets in parallel, being for a twelve, eighteen, or twenty four volt system as may be necessary or desirable for various makes of motor vehicles and based upon the rated horsepower of the vehicle motor.

A driver's electric change speed controller 181 is placed in any suitable place within the automobile or the like such as on the steering column thereof, and this controller comprises a spindle 183 which is rotated as desired by means of a lever 184, suitable sectors or bridging contacts 185, 186, 187, 188, 189, 190, 191, 192, 193, 194 and 195 respectively are adapted to co-operate with contact fingers or blocks 196, 197, 198, 199, 200, 201, 202, 203, 204, 205, 206, 207 and 208, which are circular in form and disposed within the controller casing whereby to bridge or close the several circuits of the various electric units when the controller lever 184 is moved to the different notches of the indicator or dial plate 209 associated therewith, in which operation the dynamo electric machines A, B and C clutch or lock the motion in the planetary gearing proportionate to the six different speed notches as marked on the said dial 209, but allowing a free idling motion in the gears when the lever 184 is in a neutral notch or position which action will be more fully explained when tracing the circuits for the different speeds.

Suitable switches 210, 211 and 212 are provided and these switches are connected one parallel with respect to the other, and in series with a main transmission control switch 213. These switches 210, 211, 212 and 213 are triple bladed, one blade of each opening the battery circuit in the main line, a second of each opening the line to the voltage controller 232 and the remaining blade thereof opening the line between dynamos A and C, thus it will be seen by reference to Fig. 10 that these switches 213, 210, 211 and 212 have control over the electric transmission. The series switch 213 is a key switch located in any suitable position in an automobile, such as on the instrument board thereof.

The left foot pedal 170' is termed the electric clutch and service brake pedal being connected by any suitable mechanical connection as in Fig. 15 to switch 210 which in normal position is closed, and by rod 275 to the rear wheel hub brakes (not shown) of the vehicle and when applied will open circuit by the said switch 210 of the electric units of the transmission before the brake takes hold making a foot control for placing the transmission in neutral and stopping the car, and in some instances would be more speedily operated than the hand control lever 184.

The right foot pedal 170 is designated as the emergency low and transmission brake pedal, because of its dual purpose in its association with the power transmission, being connected by any suitable mechanical connection, as before illustrated with reference to Figures 13 and 14, to the brake band 161 and the parallel transmission switch 211, and when applied it will act as an emergency slow speed (as with any other planetary gear mechanism) if the dynamos are open circuited, as they are when lever 184 is in a neutral position, or it will act as a transmission brake slowing down the motion of the entire transmission mechanism, if applied when the dynamos are energized, as they are in any of the various speed notches from "1" to "6", because when in this energized condition, as will be hereinafter explained, the dynamos lock and prevent the turning idling motion in the planetary gears, which locked condition in the gears prevents the applied action of pedal 170 from acting as a slow speed control for the gear 40. Now when the dynamos are in this energized condition, if the electric clutch and brake pedal 170' is applied and opens switch 210 at the same time when the emergency low and transmission brake pedal 170 is applied and closes switch 211, the circuits will remain closed because as aforesaid both switches 210 and 211 are parallel with each other and the result of this combined action will be that both pedals 170' and 170 will act as brakes to the motion of the car, causing an ofttime desired speedy slowing down and stopping of the vehicle.

A transmission and ignition control lever 217 operates the parallel transmission switch 212 and the ignition switch 245, and the said lever 217 is pivoted so that when it is pushed forward into the notch with the wording "Off" of the indicator plate 209, the ignition switch 245 will be opened and the transmission switch 212 will be closed, whereby, when the ignition is off, pedal 170' in opening switch 210, will not open the transmission circuits which prevents placing the gears in neutral when descending a grade with dead motor compression, but the gears can be put into neutral if wanted to coast freely by placing lever 184 into a neutral notch.

Referring to the wiring diagram Fig. 10 and also the assembly of the dynamo electric machines as in Fig. 1 dynamo B is the generator and is connected in circuit with a pole changer or current reversing switch so as to supply a continuous charge in one direction for the batteries 231 irrespective of the direction of current in the said dynamo B. This pole changer has the form of a spool like body 220 on which are formed the coils or windings 221, which act either as generator shunting resistance coils or as solenoid magnetizing coils for the operation of the pole changer. Extending through the bore of the body 220 is a spindle 222 made of non-magnetic metal, such as copper, brass or bronze, which carries at its opposite ends permanent bar magnets 223 and 224, the poles of which magnets face each other at the ends connected to the said movable spindle. These magnets 223 and 224 in turn are held nominally balanced between opposite disposed springs 225 and 226, and carried on each of the bar magnet portions 223 and 224 thereof are pairs of contact fingers 227, 227′ and 228, 228′ respectively, which are co-operative with complemental pairs of stationary contacts 229, 229′ and 230, 230′. The coils 223′ and 224′ surround the permanent bar magnets 223 and 224 as shown (see Fig. 10) and are in series with the charging circuit, the action of which will be hereinafter more fully described in tracing the circuits. Co-operative with the various electric units is a voltage controller 232 (see Fig. 10) constructed somewhat similar to a watt meter and operating on the principle of a volt meter, which regulates the voltage by metering or measuring out the current to the various circuits. This voltage controller is therefore of a motor meter type and the motor 233 has a high resistance bi-polar field and drum type of armature and is connected through switches 210 and 213 across the series multiple battery system circuit, which batteries 231 as aforesaid are composed of low voltage cells having a wide range of electro-motive force, in that they may be charged and discharged through a wide range of voltage. The armature of the motor 233 is preferably geared by means of worm gears 234 to a lever 237 and in the operation when the said switches 210 and 213 close the circuit of the motor 233 with the batteries 231, the said motor 233 will pull against the action of a coiled spring 235 encircling the armature spindle and coiled springs 236 connected to the lever 237, in a manner to cause the said lever 237 to move in accordance with any fluctuation of voltage of the batteries 231. The action of the motor 233 of the voltage controller 232 is regulated by adjusting the tension of the springs 235, 236, so as to cause the lever 237 to move over the figures of the dial 215 in unison with the reading of the voltage meter 243. This controller lever 227 is provided with three separately insulated contact strips or fingers 238, 239 and 240 which cooperate with a series of complemental segments for the making of the connections for the control of voltage of the batteries 231, or in other words, this motor meter voltage controller 232 when connected across the terminals of a 12 volt, multiple series, group of batteries 231, having a range of from 8 to 14 volts, as shown on dial 215, from discharge to complete charge, will produce a torque in the armature of motor 233 causing the same to revolve against the tension of springs 235 and 236 until their tension becomes as great as E. M. F. in the armature of motor 233, at which time the said armature will become equally balanced between the two opposite powers, and will obviously vary in a forward and backward rotation with the increase or decrease in voltage across the battery terminals 272 and 273, as the same will increase or decrease the E. M. F. in the motor 233, which in turn, through the medium of lever 237 carrying contacts 238, 239 and 240 in engagement with rheostat coils 241, 242 and contacts 265, 266, will regulate the current in the circuits with these said coils and contacts. The making of the connection for control can be had by regulating through rheostat coils 241 and 242 the amperage of dynamos A and C, when they are connected to the batteries 231 as meters, by increasing the resistance thereof in their respective circuits with contact fingers 239 and 240 in contact with rheostat coils 241, 242 as the voltage drops or vice versa by cutting out or decreasing the resistance in coils 241 and 242 in said dynamos A and C circuits as the voltage of the batteries raises, and also by regulating the action of the pole changer with contact finger 238, by cutting out of the generator B's circuit more of the coils 221 thereof as the voltage raises, which action reduces the magnetic pull in the pole changer allowing the springs 225 and 226 to open the charging circuit when the battery charge reaches a definite value, this action also shunts the current through the remaining coils left in a circuit with the armature B′ of the generator B thus shorting the said generator as is desired for a clutching effect in the planetary gearing and will hereinafter be more fully explained.

Thus it will be seen from the above stated operation that the action of the voltage controller 232 is automatic and the amount of energy or electric current used by the various dynamos when connected as motors depends upon the condition of the batteries 231, which action provides a means of keeping the batteries in a properly charged condition and also at the same time provides a means of controlling the voltage and amperage in the circuits of the various dynamos, which action puts a dependable control on the speed of each dynamo for the various change speed positions of the change speed controller 181.

Referring to the various control units and planetary gears as hereinbefore described, and with the lever 217 in the notch marked with the "Off" indication, and the lever 184 in the notch marked "On" the ignition switch 245 is opened and the controller lever 184 is in the first neutral position whereby all the electric units are open circuited, and in this position, the vehicle and motor are stopped and are termed dead. To start the engine or motor close the key switches 213 and 214 and move lever 217 into the notch marked "On," and the lever 217 in its movement to such position will shift lever 184 out of the notch engaged thereby and move the same into the notch marked "S" and, with the levers in this position, the ignition switch 245 is closed, and the spindle 183 will move the sectors carried thereby to the position indicated "S," at which time connections are made from the batteries 231 to dynamo A through the change speed controller 181, the circuit of which may be traced from bridging sector 185, contacts 196, rheostat coils 242, lead 247, in parallel through field $A^2$ and armature $A^1$ of dynamo A, lead 248, contacts 200 and bridging sector 189, contacts 197 and bridging sector 186, line 249, lead 274, ammeter 244, lead 273, batteries 231, lead 272, lead 271, middle switch blade 210, back switch blade 213, lead 270, line 246, back to contacts 196. The dynamo A is now a motor and its armature $A^1$ is rigidly connected to the internal gear 39 and turns the said gear 39 ahead, or in the direction in which the crank shaft 20 of the engine revolves. The circuit of dynamo C is to be traced from bridging sector 195, contacts 208, lead 275, rheostat coils 241, lead 280, parallel at commutator brush c, one circuit through armature $C^1$, lead 250; contacts 206 and bridging sector 194, lead 269, the other circuit by lead 251, contacts 204 and bridge 193, lead 252, up through field $C^2$, lead 263, contacts 206 and sector bridge 194, cutting in with the other circuit at lead 269, then by line 249, lead 274, ammeter 244, lead 273, batteries 231, lead 272, lead 271, middle switch blade 210, back switch blade 213, lead 270, line 246, back to contacts 208, and as thus connected to the batteries 231 dynamo C is operated as a motor and its armature $C^1$ is rigidly connected to the sun spur gear 40 through the tubular housing 47 and turns the said gear 40 backward or in the reverse direction in which the crank shaft 20 of the engine revolves. Now, as gear 39 is turned forward by dynamo A and gear 40 backward by dynamo C, with gear 41 stationary during this operation, the planet pinions 37 and 38 will be revolved around gear 41, causing the said gears 37 and 38 to acquire a bodily forward motion on the shafts 35 which motion is imparted to the crank shaft 20 of the engine, through the gear carrier plate 34, coupling ring 29 and fly wheel 23. It will thus be seen that by this action of the planetary gearing, caused by dynamos A and C operating as motors, turns crank shaft 20 of the engine at a reduced gear ratio and slow speed for starting.

The next notch "N" on the indicator plate or dial 209 is the second neutral and is the one in which the lever 184 is placed when it is desirous to open circuit or neutralize the electric change speed mechanism while the engine is running. The sun spur gear 40 is called the low or slow speed gear in that holding or retarding its motion by the dynamo C puts the car in low gear, since the action of the same is in a backward direction or effects a losing motion in the planetary gears, which is imparted to the driven gear 41 as with most any other ordinary planetary mechanism. The internal gear 39 is called the high speed gear for any holding or retarding of its motion, by a short circuited action in dynamo A, puts the car in high gear, as such action causes an increased forward motion in the planetary gears which is imparted to the driven gear 41, while any locking or gripping together the motion of the high speed gear 39 and the slow speed gear 40, by dynamo B puts the car in intermediate gear, that is, in a speed intermediate between the two gears. Now as each of the three dynamos is connected to the planetary gearing each will revolve during the operation for each speed, and by using these dynamos A, B and C as motors or generators to help or retard this motion in each other, as desired and accomplished by the controller 181, six different speeds are obtained.

In calculating the various speeds as marked on the dial 209 the dynamo A may be considered as 6, as controlling the highest speed; dynamo C may be considered 1, as controlling the slowest speed; while dynamo B may be considered as 3, as controlling the intermediate speed.

When lever 184 is moved into the notch marked "D" of dial plate 209, the sectors carried thereby will be in the position indicated "D," in Figures 10 and 11, during which operation dynamo A through the same circuit as hereinbefore traced for engine starting, operates as a motor turning gear 39 ahead or in a forward direction, while dynamo C is short circuited, the circuit of which may be traced from bridging sector 193, contacts 204, lead 252, up through field $C^2$, lead 263, second set of contacts 206 and sector bridge 194, lead 250, commutator brush $c'$, up through armature $C^1$, brush $c$, lead 251, back to contacts 204, completing a closed circuit in dynamo C. It is now to be seen that the current does not travel by two separate or parallel paths through dynamo C as when used in the "S" position as a motor, but instead the current goes series through the field $C^2$ and armature $C^1$, and by further reference to Figure 4 it is to be seen that the manner of yoke winding 100 of the field structure $C^2$ provides a comparatively high resistance field which being connected in series prevents an excessive current in dynamo C's short circuit. Also the current goes up through the field $C^2$ or in the same direction as when in the "S" position of control so that the field polarity is not changed, and it is the residual magnetism left in the field $C^2$, when used as a motor in the "S" position that first energizes field $C^2$ of the dynamo C in this "D" position. The current in the armature is now reversed to what it was in the "S" position so that while the motion is the same the action in armature $C^1$ is reversed, or to the effect of a retard to the motion, when the said dynamo C is short circuited.

With the circuits in this condition dynamo C operates as a generator and the current thus generated in itself produces an electromagnetism, which causes a holding or braking effect on the slow speed gear 40, but allowing it to slip slightly, and can, while in this speed, if desired, be aided by applying pedal 170, as by holding the slow speed gear 40 partially stationary and turning gear 39 ahead, or in the direction which the crank shaft 20 turns, as is accomplished in this operation, the vehicle on which this mechanism is installed, will be moved at a slow speed driven by the power of the said shaft 20 of the vehicle's motor, and also by the power imparted to gear 39 by the magnetomotive force in armature $A^1$ of dynamo A connected as a motor and supplied with current from the storage batteries 231, which operation provides an increased or an emergency power greater than that obtained from the shaft 20 of the engine alone, and for this reason, the notch on dial plate 209 is marked "D" as indicative of the motor power of shaft 20, receiving additional power from the said batteries.

When lever 184 is placed into the notch marked "I" of the dial plate 209, the sectors carried by spindle 183 will be moved to the position indicated "I" in Figure 10, during which action the generator B is brought into use to change the batteries 231, and also supply current to dynamo A, during which operation all the coils 221 are connected in series in generator B's shunting circuit, which series condition of the said coils 221 allows but few amperes of current to shunt back through the armature $B^1$ of generator B, which action in generator B has only a partial clutching effect between gears 39 and 40, as will be hereinafter more fully explained in tracing the circuits. Dynamo A still connected as a motor is taking the remainder of the current from generator B that is not used to charge the batteries 231, as regulated by the voltage controller 232 through rheostat coils 242. While dynamo C is still short circuited, as traced and explained in the "D" position of control holding the motion of gear 40, the effect of the action of the generator B and dynamo A as a motor is such that dynamo C is aided in its duty to hold or prevent an excessive turning backward of the low controlling gear 40. During this operation the car is driven in the first or slow speed position of control. The circuit through which field $B^2$ is excited or energized may be traced from bridging sector 191, contacts 202, line 249, lead 274, ammeter 244, lead 273, batteries 231, lead 272, lead 271, middle switch blade 210, back switch blade 213, lead 270, line 246, lead 254, through field $B^2$, lead 253, back to contacts 202. The armature $B^1$'s shunted circuit may be traced from bridging sector 192, contacts 203, lead 256, front switch blade 213, front switch blade 210, lead 258, lead 259, lead 276, in series through all the coils 221, lead 255, through armature $B^1$, lead 257, back to contacts 203. The current in this circuit may be in either direction as the action in the planetary gearing for some operations revolves the generator B in one direction while for other operations the motion is reversed and as with any other ordinary generator, with a separate excited field, a reverse motion reverses the current in the armature. The current in this shunted circuit, through the solenoid coils 221, controls the action of the pole changer by moving the magnets 223 and 224 in either direction according to the direction of the current in the coils 221. The springs 225 and 226 attached to the said magnets 223 and 224 are tensioned so as to prevent the engagement of the contacts 227, 227' or 228, 228' with the stationary contacts 229, 229' or 230, 230' until the voltage of the generator B is higher than the rating of the voltage of the batteries 231; and this voltage in generator B and across the solenoid coils 221, by the shunted circuit, obviously determines the magnetizing force of the said coils and the magnetic attraction in the solenoid core 220, which attraction must be greater than the tension of the springs 225 and 226 before the said contacts will be engaged, preventing any possibility of the batteries 231 from discharging through the generator B. When the voltage across the brushes $b$ and $b'$ of the generator B is higher than the battery rating, or above 14 volts for the particular system shown in Figure 10, there will be sufficient amperage through the coil 221, to produce a magnetic effect, that will cause the drawing into the solenoid core 220 one or the other of the bar magnets 223 or 224, according to the polarity of the said solenoid, as determined by the direction of the current in generator B's shunted circuit. The permanent bar magnets 223 and 224 are series wound with coils 223' and 224', and the effect of these said coils is to aid or boost the strength of the said bar magnets so that the active contacts carried thereby are more positively engaged with their stationary contacts, when the electric generator B is charging the batteries 231, while any tendency of the latter to discharge through the generator B is further prevented as a reverse current in these coils 223' and 224' will neutralize the polarity of the magnets 223 and 224, and also buck the polarity of the solenoid coils 221, allowing the springs 225 and 226 to center the movable non-magnetic spindle 222 within the solenoid core 220 separating the contacts and breaking the charging circuit. Considering now that the generator B has sufficient voltage or electric pressure in its armature B¹ to operate the pole changer, and the current in the shunted circuit is (as was hereinbefore traced and is) such that, the south pole of the solenoid coils 221 is on the left end or at the point indicated by the numeral 220 of the solenoid core, the bar magnet 223 will be moved to the right or drawn into the solenoid core 220, while the north polarity on the right end of the solenoid coils 221 will expel or repel magnet 224. This action will cause the contacts 227 and 227' to be pressed against contacts 229 and 229' closing generator B's charging circuit through which the batteries 231 are now to be charged, and this circuit may be traced from sector bridge 192, contacts 203, lead 256, first switch blade 213, first switch blade 210, lead 258, lead 259, one helix of the windings 223', contact 227, contact 229, line 246, lead 270, back switch blade 213, middle switch blade 210, lead 271, lead 272, through batteries 231, lead 273, ammeter 244, lead 274, line 249, contact 229', contact 227', the other helix of windings 223', lead 255, through armature B¹, lead 257, back to contacts 203. Considering now that the motion in generator B is reversed, the current in armature B¹'s shunted circuit will now be reversed, and this circuit is now to be traced from sector bridge 192, contacts 203, lead 257, through armature B¹, lead 255, in series through all the coils 221, lead 276, lead 259, lead 258, front switch blade 210, front switch blade 213, lead 256, back to contacts 203. The south polarity of the solenoid coils 221 is now on its right end, and will attract the magnet 224, while the north pole on the left end of the said solenoid coils 221 will repel magnet 223. This action will cause the separation of contacts 227 and 227' from contacts 229 and 229', and the pressing together of contacts 228 and 228' with contacts 230 and 230', which reverse position of the pole changer, causes the current from generator B to go through the batteries in the same direction as by the former charging circuit hereinbefore traced. The circuit as now connected is to be traced from sector bridge 192, contacts 203, lead 257, through field B¹, lead 260, one helix of windings 224', contact 228, contact 230, line 246, lead 270, back switch blade 213, middle switch blade 210, lead 271, lead 272, through batteries 231, lead 273, ammeter 244, lead 274, line 249, contact 230', contact 228', the other helix of windings 224', lead 258, front switch blade 210, front switch blade 213, lead 256, back to contacts 203.

The generated current of the dynamo B flows in one direction, when the vehicle motor pulls the car, and reverses when the car crowds the motor, as on descending grades, as at this time the motion in the planetary gears is changed, and the said dynamo B will run or rotate in a reverse direction. As hereinbefore explained, the dynamo B has its armature B¹ rigidly connected to gear 39, through hub 46, and its field structure B² rigidly connected to gear 40 through the tubular housing 47, as both the armature structure B¹ and the field structure B² are free to revolve, the generator action thereof causes the internal gear 39 to follow the sun spur gear 40 or vice versa, and as each is in mesh with the planetary pinions 38 a partial locking of the motion in the planetary gearing results. During this "1" speed operation, because of the arrangement of the batteries 231 in the circuits, dynamo A operating as a motor can at this time take current from lines 246 and 249, directly from the generator B. It will be seen by arrangement of the wiring in Fig. 10 that the batteries 231 are what is termed floating on the line, which condition, together with the action of the solenoid shunted coils, as hereinbefore explained, prevents charging the batteries at an excessive rate. The main function of the batteries 231 in the different change speeds is not to supply power to the various electric dynamos, but is to act jointly with the controller 232 as a governing power, for the dynamos electric machines A, B and C.

When lever 184 is moved into the notch marked "2," of indicator plate 209, the sectors carried by spindle 183 will assume the position indicated "2" in Figure 10, during which operation the transmission will be operated at a second speed, at which time dynamo A is open circuited or idle, as will be readily apparent by reason of the second gap in the contact fingers 200 and from the fact that the sectors 185 and 186 have passed over the contact fingers or blocks 196 and 197. Dynamo B is charging the batteries with all the solenoid coils 221 still connected in series with the circuits as traced in speed 1, while dynamo C through connections made in the controller 181 is pulling ahead on the sun spur gear 40. In this action dynamo C as a motor takes the surplus current (that not used to charge the batteries 231) from the dynamo B to boost ahead on the slow speed gear 40, thus equalizing the speed of the intermediate and low gear, i. e., it places the speed of the transmission shaft 43 half way between that controlled by dynamo B and that controlled by dynamo C, and as dynamo B, as hereinbefore explained controls the third or intermediate speed between A as 6 and C as 1, half way between 3 and 1 is 2 calculated as hereinbefore explained. The circuits of the dynamo C in this operation is now to be traced from sector bridge 195, second set of contacts 208, lead 275, rheostat coils 241, lead 280, separating and becoming parallel at commutator brush $c$ and lead 251, one circuit is to be traced through armature $C^1$, lead 250, first set of triple contacts 207 and sector bridge 194, lead 269, the other parallel circuit by lead 251, contacts 205 and sector bridge 193, lead 263, down through field $C^2$, lead 252, first set of triple contacts 207 and sector bridge 194, joining the other circuit at lead 269, negative main line 249, and the circuit is now to be traced through generator B, as the source of current supply, by way of one or the other of the charging circuits hereinbefore traced for the speed "I" position of control, to positive main line 246, and back to contacts 208. With dynamo C's circuits as traced it is to be seen by the cross between contacts 204 with 207 and 206 with 205 in field $C^2$'s circuit that the positive and negative connections are reversed as now dynamo C's motion is changed from backward to forward, for this reason there is a complete break in dynamo C's connections in the controller 181, between the "I" and "2" speed positions of control, as is to be seen by the wide ridge between the marks "I" and "2" of the dial 209, and by the gap between the "I" and "2" positions assumed by the sectors in Figure 10.

With lever 184 in the notch "3" of the dial plate 209, the sectors carried by the spindle 183 will be in the position indicated "3." Dynamo A now as a generator is connected in circuit with and driving the dynamo C as a motor ahead equalizing the speed of the high speed gear 39 and the low speed gear 40, or half way between A as 6 and C as 1, which is 3. While the dynamo B is charging the batteries 231 with the excessive current going through only a portion of the coils 221 and shorting its armature, which action in dynamo B is to the effect of a clutch between gears 39 and 40. There is now in this operation a combined action of the dynamos A, B and C in a speed half way or intermediate between the six various speeds. In this operation the field $A^2$ and armature $A^1$ of dynamo A are connected in series, while the field $C^2$ and armature $C^1$ of dynamo C are connected in parallel as it was when operated in the "2" speed position of control. The circuit is to be traced from sector bridge 188, contacts 199, lead 262, separating and becoming parallel at the upper terminal of field $C^2$ and lead 263, one circuit to be traced down through field $C^2$ and lead 252, the other circuit by lead 263, contacts 205 and sector bridge 193, lead 251, down through armature $C^1$, lead 250, contacts 207 and sector bridge 194, joining in with the other parallel circuit at lead 252, thence by lead 264, back switch blade 210, middle switch blade 213, lead 265, contacts 201 and sector bridge 190, lead 248, up through armature $A^1$ as the source of current supply, through field $A^2$, lead 261, back to contacts 199. The current now generated in dynamo A by the motion in the planetary gearing is built up from the residual magnetism left in the field pieces 73 of the field $A^2$ when the dynamo A was used as a motor in the "S," "D" and "I" positions of control. Therefore it will be seen that the current goes through the windings 74 of the field $A^2$ in the same direction as when formerly in use, but reverses in the armature $A^1$, while the dynamo B is charging the batteries through the same charging circuit as traced and explained in the first or notch 1 speed position. But now the excessive current short circuits through the armature $B^1$, and is regulated by the voltage controller 232, which action may be explained considering this to be a twelve volt battery system, and the batteries 231 in this present instance have normal charge of twelve volts, the lever 237 of the voltage controller 232, through the action of motor 233 and against the adjustable tension of the springs 235 and 236 as hereinbefore explained is caused to move the upper of its contact strips 238 across the contact blocks 265, whereby the circuit is closed through the third of the contact blocks 266, the controller arm now stands at figure "12" on the dial plate 215 of the controller 232. The circuit in this instance will be traced from sector 187, contacts 198, lead 268, lead 259, lead 258, front switch blade 210, front switch blade 213, lead 256, contacts 203 and sector bridge 192, lead 257, through armature $B^1$, lead 255, first two coils 221, lead 278, third contact 266, bridging contact 238 and contact 265, lead 267, back to contacts 198. This is generator B's short circuit by which the surplus current is shunted, by the action of the voltage controller 232, away from the battery charging circuit, and this increased current caused by the partial short circuit in armature B¹, increases the electromagnetism between armature B¹ and field B² in such a manner to allow but a slow motion between gears 39 and 40, locking the same in a manner to allow but a slight slip in the planetary gearing, which together with the action of dynamos A and C, causes the said planetary gear mechanism to revolve as a unit having practically the same motion as the fly wheel 23 of the engine.

With the lever 184 in the notch marked "4" on the dial 209, the sectors carried by the spindle 183 will be in the position indicated "4" in Figure 10, at which time dynamo A is idle, being in an open circuited condition, dynamo B is charging the batteries 231 with the excessive current shorting its armature as traced and explained in speed three, while dynamo C is open circuited or idle. This is the best charging notch and should be used on descending grades. If a driver has a grade to ascend he can use notch "D" using the power from the batteries and helping the vehicle's motor providing he soon has a grade to descend to replenish the charge quickly while in notch 4, in which manner the driver can be economical on gasoline or motor fuel. A voltmeter 243 and an ammeter 244 are placed in any suitable position on the dash or instrument board of the motor vehicle on which the mechanism is installed, whereby the rate of charge and discharge as well as the voltage or condition of the batteries may be determined at any time.

With lever 184 in the notch marked "5" of the indicator plate 209, the sectors carried by the spindle 183 will assume the position indicated "5" in Figure 10, during which operation dynamo A is short circuited, being closed by the third set of contact blocks 200 and bridging sector 189, and consequently exerts a holding or retarding action on the motion of the high speed gear 39, which action as hereinbefore explained, can cause the torque or driving shaft to revolve faster or at a greater speed than that of the vehicle's motor while at the same time, dynamo B is charging the batteries 231 with the excessive current short circuited through its armature B¹, as hereinbefore traced in speed 3, while dynamo C is still open circuited or idle, the action of generator B is now to the effect of a retard to the increased motion, caused by the short circuited condition of dynamo A, so that the control in this position is such that the speed ratio is between the high and intermediate speeds, or part way between the high gear 39 as controlled by dynamo A and the intermediate gear as controlled by dynamo B.

With lever 184 in the notch marked "6" of the indicator plate 209, the sectors carried by the spindle 183, will assume the position indicated "6" in Figure 10, during which operation dynamo A is still short circuited while generator B is charging the batteries 231 with all the solenoid coils 221 in series therein, as they were in the lower speeds, inasmuch as bridging contact or sector 187 has passed over the contact block 198, and, when out of the circuit with the coils 221 and contacts 265 and 266 as at this period, will not permit the upper contact strip 238 on the arm 237 to cut out of the circuit any of the said coils 221. The control of the voltage of the batteries 231 at this time, as hereinbefore explained depends upon the rheostat coils 242 and 241, for an increase in the voltage causes the lever 237 of the voltage controller 232 to move toward the closed ends of the rheostat coils 241 and 242, which action in cutting out a portion of the said coils reduces the resistance in dynamos A and C circuits, taking from the line a surplus of current generated by the dynamo B. This excessive current is now going to the dynamo C as a motor pulling ahead on the slow speed gear 40, and the effect of taking this current, which formerly short-circuited B as in "5", (which short circuit caused a greater retard) to increase the speed of dynamo C, causes to a certain extent a decrease in the retarding effect of generator B, which correspondingly allows dynamo A in a short-circuited condition to further decrease the speed of gear 39, which action, in turn, increases the speed of gear 41 and transmission shaft 43, during which action the circuit is to be traced from sector bridge 195, last set of contacts 208, lead 275, rheostat coil 241, lead 280, separating and becoming parallel at commutator brush c and lead 251, one circuit by lead 251, contacts 205 and sector bridge 193, lead 263 down through field C², lead 252, last set of contacts 207 and sector bridge 194, main line 249, the other parallel circuit from commutator brush c through armature C¹, lead 250, last set of contacts 207 and sector bridge 194, joining the other parallel circuit at main line 249, then through generator B by one or the other of the charging circuits as traced in speed "I" position of control, main line 246, back to last set of contacts 208. In this highest and last speed in addition to the action as explained in speed "5' dynamo C is brought into action, as a motor, to boost the now forward turning motion of the slow speed gear 40, which action helps the electromagnetism of dynamo A in short circuited condition to hold the high speed gear 39 stationary, which when prevented from turning ahead, as heretofore explained causes the transmission shafts 43 and 147 to revolve at a speed about one-half faster than that of the crank shaft 20 of the vehicle's motor, or than that as electro-magnetically controlled by the dynamos A, B and C in the "3" speed position of control.

Now in comparison with the three speed selective gear transmission in common use and considering no change in the rear axle gearing, with this electro-mechaincal or electric control planetary gear mechanism, when lever 184 is in notches 5 and 6 the car can be brought to as high as one half faster than ordinary direct drives, and while in notches 1, 2 and 3 the car will be about in the present low, intermediate and high speeds, while in notch "D", besides being in low the car has an added power of the batteries.

It is to be well understood that, whenever the terms "planetary" or "sun gears" are used herein, the same are to be defined as meaning, any combination of gears or train of gears having driving, driven and change speed controlling parts or gears, wherein such gears, or speed controlling parts are always in contact or mesh one with respect to the other, also, that while a preferred embodiment of the electro-mechanical transmission mechanism has been described and illustrated herein in specific terms and details of construction, arrangement and operation, various changes in and modifications of the same may be resorted to without departing from the spirit of the invention, or the scope of the claims appended hereto.

Having thus fully described the invention, what is claimed is:—

1. A mechanism for transmitting the power from the motor of a vehicle to the driving wheels thereof, comprising a motor shaft, a transmission shaft, a planetary gearing, a driving coupling means between said planetary gearing and said motor shaft, a driving connection between said planetary gearing and said transmission shaft, a plurality of dynamo electric machines arranged independently over the said transmission shaft and operatively connected with said gearing for effecting the starting up of the motor of the vehicle and further for varying the speed of the transmission shaft from the minimum power of the motor to the maximum power thereof, and means for selectively controlling the operation of said dynamo electric machines for the purpose aforesaid.

2. In a motor vehicle, a power motor with a crank shaft, a transmission operated therefrom for the traction wheels of the vehicle, a planetary gearing arranged over a driving shaft in the said transmission, a series of dynamo electric machines each connected to a controlling gear of the said planetary gearing, and each independently operated and further operated independent of the said transmission driving shaft, means for operating each of the said machines as a motor or generator to effect the starting of the power motor of the vehicle and to provide for variation in the speed of the transmission from the minimum power of the motor of the vehicle to the maximum power thereof, and further for charging a group of batteries carried on the vehicle by one of said electric machines, and means for selectively controlling the operation of said electric machines for the purpose aforesaid.

3. A combination transmission mechanism cooperative with the power motor and driving wheels of a motor vehicle, comprising a flanged fly wheel mounted on the shaft of the vehicle's motor, a planetary gearing partially enclosed within the flanged portion of the said fly wheel, a coupling connecting the said planetary gearing to the flanged portion of the said fly wheel, a series of electric machines connected to said planetary gearing and surrounding and further operable independently of the transmission shaft of the vehicle and adapted for effecting the starting up of the power motor of the vehicle, for transmitting the power of the said power motor at varying speeds to the driving wheels of the vehicle, and for effecting the charging of a battery carried by the vehicle, and means for selectively controlling the operation of said electric machines for such purpose.

4. In a combination transmission mechanism cooperative with the power motor and driving wheels of a motor vehicle, a flanged fly wheel mounted on the shaft of the vehicle's motor, a gear carrier enclosed within the flanged portion of the said fly wheel, a coupling ring with lugs connecting the said gear carrier in a flexible manner to the flanged portion of the said fly wheel, a planetary gear train with planet pinions carried by the said gear carrier, a transmission shaft with a driven sun gear of the said planetary gear train fastened to it, a series of electric machines connected to speed controlling gears of the said planetary gear train and adapted for starting up the power motor of the vehicle, for transmitting the power of the said power motor at various electromagnetic controlled speeds to the driving wheels of the vehicle, and for effecting the charging of a battery carried by the vehicle, and means for selectively controlling the operation of said electric machines.

5. The combination with a motor vehicle of the automobile class, of planetary gears arranged in a train and operatively connected to the motor of the vehicle, a power transmission shaft driven from one of the gears of the said train, a slow speed sun gear in the said train and having an extended hub surrounding the said transmission shaft, a high speed internal gear in the said train and having an extended hub surrounding the said extended hub of the slow speed gear, a plurality of dynamo electric machines carried by the said hubs and adapted for effecting the starting up of the motor of the vehicle, for transmitting the power from the said vehicle's motor or the power thereof at varying speeds to the driving wheels of the vehicle through said shaft, and for the charging of the batteries carried by the vehicle, and means for selectively controlling the operation of the said dynamo electric machines for such purpose.

6. In any motor car or the like an electrically controlled planetary gear transmission mechanism in connection with a motor adapted to make a unit power plant comprising dual planetary gearing flexibly coupled to the said motor, a driving shaft in the said transmission mechanism, a driven sun gear in the said planetary gearing and secured to the said driving shaft, speed controlling gears in the said planetary gearing, electric machines fastened to the said speed controlling gears, commutation through brushes and leads to the said electric machines, voltage and ampere controlling units consisting of rheostat coils regulated by a motor meter in circuit with the said leads, storage batteries in circuit with the said controlling units and the said electric machines, a driver's electric controller adapted to connect the circuits of the said electric machines and batteries for starting up the motor of the said power plant and also connect circuits for transmitting the power thereof at various speeds to the traction wheels of the said motor car.

7. A transmission mechanism for motor vehicles comprising a drive shaft operated from the motor of the vehicle and provided with a fly wheel, a transmission shaft for operating the drive wheels of the vehicle, an operative drive connection between said fly wheel and said transmission shaft and constituting a gear carrier, a planetary gear train with certain of the gears supported by said carrier, a gear in connection with said transmission shaft and of said planetary gear train constituting a driving means, a low speed and a high speed driving member of said gear train and constituting a controlling means for the driving means, dynamos operable independently of said transmission shaft, an operative drive connection between one of said dynamos and said low speed driving member for electromagnetically controlling the operation thereof and the other of said dynamos and said high speed driving member for electromagnetically controlling the operation thereof, and a controller associated with said dynamos for selectively controlling the operation thereof.

8. A transmission mechanism for motor vehicles comprising a driving shaft operated from the motor of the vehicle, a transmission shaft for the drive wheels of the vehicle, an operative drive connection means between said transmission shaft and said drive shaft, a planetary gear train, certain of the gears of said train carried by said means, a gear of said gear train constituting a driving means and other gears of said train constituting a controlling means for the driving means, an operative drive connection between said transmission shaft and said driving means, a low speed and a high speed driving member of said controlling means, dynamo electric machines surrounding and operable independently of said transmission shaft, an operative drive connection between one of said machines and said low speed driving member, an operative drive connection between another of said machines and said high speed driving member, and means for selectively operating said machines.

9. A transmission mechanism for motor vehicles comprising two simultaneously operating planetary gears of a gear train, one constituting a high speed driving means and the other constituting a low speed driving means, motor driven members operatively connected with both of said driving means and having a universal joint connection with the driving wheels of the vehicle, a motor driven member operatively engaging with said driving means whereby said planetary gears are operated simultaneously at high speeds, a motor driven member operatively engaging with said driving means whereby said planetary gears are operated simultaneously at low speeds, a dynamo operably connected with the said high speed driving means for magnetically controlling the operation thereof, a dynamo operably connected to the said low speed driving means for magnetically controlling the operation thereof, and means for selectively controlling the operation of said dynamos.

10. A transmission mechanism for motor vehicles comprising a drive shaft operated from the motor of the vehicle, a transmission shaft for operating the drive wheels of the vehicle, coupling means for operating said transmission shaft from said drive shaft, a train of simultaneously operating planetary gears, one of said gears of the train constituting a driving means and other gears of the said train constituting a controlling means for the driving means, a high speed drive operably engaging with said controlling means whereby said gears are operated simultaneously at high speeds, a slow speed drive operatively engaging with said controlling means whereby the gears are operated simultaneously at slow speeds, an operative drive connection between said transmission shaft and said driving means, a dynamo operable independent of said transmission shaft and connected with and operating said high speed drive, a dynamo operable independently of said transmission shaft and connected with and operating said low speed drive, and a controller for said dynamos.

11. A transmission mechanism for motor vehicles comprising a drive shaft operated from the motor of the vehicle, a transmission shaft operatively connected with the drive wheels of the vehicle, an operative drive connection between the two said shafts and constituting a gear carrier, a train of simultaneously operating planetary gears with planet pinions supported by said carrier, one of said gears of the train constituting a driving means and the other gears of the said train constituting a controlling means for the driving means, an operative drive connection between said transmission shaft and said driving means, a slow speed driving member for said controlling means, a hub extended from said member and inclosing said transmission shaft, a dynamo connected with said hub for magnetically operating said slow speed driving member, a high speed driving member for said controlling means and provided with a sleeve encircling said hub, said hub and sleeve independently operable with respect to each other, and a dynamo connected to said sleeve for magnetically operating said high speed driving member, and means for selectively operating said dynamos.

12. In a motor vehicle, a combined electric and mechanical motor starter and change speed transmission mechanism comprising motor driven gears of the "sun planet type", dynamo electric machines with fields and armatures and connected to the said "sun planet" gears and including an acyclic homopolar dynamo and a plurality of multipolar dynamos, electric conductor leads connected direct and through commutative connections to the said dynamo electric machines, a voltage controller and a pole changer connected in circuit with said leads, a group of storage batteries connected through said circuit and leads to the acyclic homopolar dynamo, for the charging of the said batteries, a driver's controller connecting the said leads to complete the circuits from said batteries to the multipolar dynamos for starting the motor of the said motor vehicle, and for transmitting the power of the motor to the driving wheels of the said motor vehicle.

13. In a motor vehicle, a combination electro-mechanical power unit comprising a drive shaft, a driven gear rigidly secured to said drive shaft, high and low speed controlling gears arranged and journalled around said drive shaft, a plate provided with stub shafts carrying journaled planet pinions in mesh with the said driven and the said speed controlling gears, an acyclic unipolar dynamo, a plurality of multipolar dynamos, the field structure and armature of the acyclic unipolar dynamo and the armatures of the multipolar dynamos fastened to the said speed controlling gears, the field structures of the said multipolar dynamos positioned concentricly with the said armatures of the said multipolar dynamos, a battery connected in circuit with said dynamos, a controller in circuit with the said batteries and dynamos and providing means for effecting the initial starting of the motor of the said power unit, and further for transmitting through a flexibility of control the power of the said power unit to the driving wheels of the motor vehicle.

14. A combination power unit for motor vehicles, comprising a transmission shaft, a driven spur gear rigidly secured to the said transmission shaft, high and low speed planetary gears rotatably arranged over said transmission shaft, a disk provided with stub shaft, planet pinions in mesh with said driven gear and said high and low speed planetary gears and carried by said stub shaft, a multipolar dynamo, the armature thereof rigidly connected to said high speed planetary gear, an acyclic homopolar dynamo having the armature thereof secured to said high speed planetary gear and the field structure thereof secured to said low speed planetary gear, a four pole dynamo having its armature secured to the said low speed planetary gear, field structures mounted concentrically with the said multipolar and four pole dynamos, a group of storage batteries connected in a circuit with the said dynamos, a pole changer in the said circuit for charging the batteries through the proper polarity connections, a voltage controller adapted to control the charging circuit for the said batteries, a driver's change speed controller adapted to open and close the circuits of the batteries and said dynamos, for effecting the starting up of the motor of the said power unit and transmitting the motive power thereof to the traction wheels of the motor vehicle.

15. In a mechanism for transmitting power from the motor of an automobile to the driving wheels thereof, the combination of a planetary gear train driven from the said motor, high and low speed sun planetary gears cooperative with the said planetary gear train, a homopolar and a plurality of multipolar dynamo electric machines interposed between said gear trains and the drive wheels of the automobile, one of said multipolar dynamos connected to the said high speed gear, another of said multipolar dynamos connected to said low speed gear, and said homopolar dynamo having its field and armature elements mounted for relative rotating movement one with respect to the other, said multipolar dynamos having rotating armatures one element of the homopolar dynamo connected for rotating movement with the rotating armature of one multipolar dynamo and the said high speed gear, and the other thereof connected for rotating movement with the rotating armature of the other multipolar dynamo and the said low speed gear, a battery connected in circuit with said dynamos, and a controller connected in circuit with the battery and said dynamos and adapted to connect the multipolar dynamos in circuit for starting the said motor, to connect the homopolar dynamo whereby to effect a clutching action between the said high and low speed gears for certain of the intermediate speeds of the automobile, to connect one of said multipolar dynamos in circuit for aiding the power thereof to that of the said motor for the driving of the automobile at greater power than that obtained from the said motor alone, and to connect the circuits of the said dynamos simultaneously for further varying the speed of the automobile.

16. In a mechanism for transmitting power from the motor of an automobile to the driving wheels thereof, the combination with the motor of the automobile, of high and low speed gears, a planetary gear train cooperative with said high and low speed gears and driven from the said motor, three dynamo electric machines interposed between said planetary gear trains and the driving wheels of the automobile, the first one of said dynamos connected to said high speed gear, and having a rotative armature, the third one of said dynamos connected to said low speed gear and having a rotative armature, and the second one of said dynamos having its armature and field mounted for alternate rotative movement one with respect to the other, said armature of said second dynamo connected for rotating movement with the rotating armature of the said first dynamo and the said high speed gear, and the said field of the second dynamo connected for rotating movement with the rotating armature of the said third dynamo and the said low speed gear, a group of storage batteries connected in circuit with the said dynamos, and a controller connected in circuit with the batteries and said dynamos and adapted to connect the first and third of the said dynamos in circuit for starting the said motor, to connect the second of said dynamos to effect a clutching action between the high and low speed gears for certain of the intermediate speeds of the automobile, to connect the first of the said dynamos in circuit for adding the power thereof to that of the said motor for driving the automobile with a motive power greater than that obtained from the said motor alone, and to connect the circuits of the said dynamos simultaneously for further varying the speed of the automobile.

17. In an automobile or the like, a transmission mechanism of electric units and planetary gears coupled to the automobile's motor in a manner to make a unit power plant, comprising a flanged fly wheel rigidly connected to the motor shaft in the said unit power plant, a coupling ring grooved into the inner periphery of the flange of the said fly wheel, a planetary gear plate grooved into the inner periphery of the said coupling ring, stub shafts secured to the face of the said planetary gear plate, sets of planetary pinions carried on the said stub shafts, a transmission shaft journaled at its forward end into the said planetary gear plate, a driving planetary spur gear fastened to the said transmission shaft and in mesh in the first set of said planetary pinions, a low speed sun planetary gear in mesh in the second set of said planetary pinions, a high speed internal planetary gear also in mesh in the said second set of said planetary pinions, a hollow extended hub rigidly connected to the said slow speed planetary gear and journaling the said transmission shaft, a hub rigidly connected to the said high speed planetary gear and journaled on the said hub of the low speed gear, an acyclic homopolar generator, multipolar dynamos, the field structure and armature of the homopolar generator and the armature of the multipolar dynamos rigidly secured on both the said hubs of the high and low speed gears, the field structures of the said multipolar dynamos positioned concentrically with the said armatures thereof on the hubs, a series of storage batteries in circuit with the said dynamos, a pole changer in circuit with said storage batteries and the said acyclic homopolar generator, a motor-meter voltage controller in cooperation with said pole changer for controlling the charging of the storage batteries from said generator, an operator's electric change speed controller arranged to make and break connections in the circuits of the said dynamos and batteries for effecting the starting of the motor of the said unit power plant, and also effecting the transmitting the power thereof at various speeds to the traction wheels of the said automobile.

18. A transmission for motor vehicles comprising the combination with the motor power shaft of the vehicle, and a transmission shaft for the driving wheels of the vehicle and operatively connected with said power shaft, of a variable speed driving mechanism operatively connected with said transmission shaft and including a pair of speed changing devices, a plurality of dynamos independent of each other and further arranged over and independent of said transmission shaft and operating said mechanism, means for connecting one of said dynamos to one of said speed changing devices for operating said mechanism at low speeds, means for connecting another of said dynamos to the other of said devices for operating said mechanism at high speeds, and means for controlling the operating of said dynamos, means to provide for one of said dynamos to constitute a generator, a battery, and a charging circuit between the said dynamo constituting a generator and said battery.

In testimony whereof, I affix my signature hereto.

A. C. HESS, Jr.